United States Patent
Pothula et al.

(10) Patent No.: US 12,242,930 B2
(45) Date of Patent: Mar. 4, 2025

(54) FEDERATED MACHINE-LEARNING PLATFORM LEVERAGING ENGINEERED FEATURES BASED ON STATISTICAL TESTS

(71) Applicant: Cerebri AI Inc., Austin, TX (US)

(72) Inventors: Sundeep Pothula, Toronto (CA); Max Changchun Huang, Toronto (CA); Thejas Narayana Prasad, Spring, TX (US); Alain Charles Briancon, Germantown, MD (US); Jean Joseph Belanger, Austin, TX (US)

(73) Assignee: Cerebri AI Inc., Austin, TX (US)

( * ) Notice: Subject to any disclaimer, the term of this patent is extended or adjusted under 35 U.S.C. 154(b) by 1127 days.

(21) Appl. No.: 17/110,022

(22) Filed: Dec. 2, 2020

(65) Prior Publication Data

US 2021/0174257 A1  Jun. 10, 2021

Related U.S. Application Data

(60) Provisional application No. 62/943,511, filed on Dec. 4, 2019.

(51) Int. Cl.
*G06N 20/00* (2019.01)
*G06F 16/27* (2019.01)
(Continued)

(52) U.S. Cl.
CPC ............ *G06N 20/00* (2019.01); *G06F 16/27* (2019.01); *G06F 16/289* (2019.01); *G06N 5/02* (2013.01);
(Continued)

(58) Field of Classification Search
CPC .......... G06N 20/00; G06N 5/02; G06N 5/022; G06F 16/27; G06F 16/289;
(Continued)

(56) References Cited

U.S. PATENT DOCUMENTS 10,402,723 B1   9/2019  Silberman et al.
10,484,343 B1  11/2019  Silberman et al.
(Continued)

OTHER PUBLICATIONS

Definition of "Open Systems Interconnection model" at Free On-Line Dictionary of Computing, at https://foldoc.org/Open+Systems+Interconnection (last updated Feb. 13, 2004) (Year: 2004).*
(Continued)

*Primary Examiner* — Omar F Fernandez Rivas
*Assistant Examiner* — Michael C. Lee
(74) *Attorney, Agent, or Firm* — Pillsbury Winthrop Shaw Pittman LLP

(57) ABSTRACT

Provided is a process including: receiving a data token to be passed from a first node to a second node; retrieving machine learning model attributes from a collection of one or more of the sub-models of a federated machine-learning model; determining based on the machine learning model attributes, that the data token is learning relevant to members of the collection of one or more of the sub-models and, in response, adding the data toke to a training set to be used by at least some members of the collection of one or more of the sub-models; determining a collection of data tokens to transmit from the second node to a third node of the set of nodes participating in a federated machine-learning model; and transmitting the collection of data tokens.

19 Claims, 5 Drawing Sheets

(51) Int. Cl.
*G06F 16/28* (2019.01)
*G06N 5/02* (2023.01)
*G06Q 10/0637* (2023.01)
*H04L 9/40* (2022.01)

(52) U.S. Cl.
CPC ....... *G06Q 10/06375* (2013.01); *H04L 63/20* (2013.01)

(58) Field of Classification Search
CPC .............. G06Q 10/06375; H04L 63/20; H04L 63/0428; H04W 12/02
See application file for complete search history.

(56) References Cited

U.S. PATENT DOCUMENTS

| | | | |
|---|---|---|---|
| 10,762,563 B2 | 9/2020 | Belanger et al. | |
| 10,783,535 B2 | 9/2020 | Belanger et al. | |
| 10,861,028 B2 | 12/2020 | Silberman et al. | |
| 11,068,942 B2 | 7/2021 | Briancon et al. | |
| 11,082,409 B2 | 8/2021 | Silberman et al. | |
| 2016/0103692 A1* | 4/2016 | Guntaka | G06F 9/4401 713/2 |
| 2017/0168472 A1* | 6/2017 | Ando | G06F 9/44521 |
| 2017/0337214 A1* | 11/2017 | Ko | G06F 16/215 |
| 2018/0349929 A1* | 12/2018 | Blomberg | G06Q 40/12 |
| 2019/0228461 A1* | 7/2019 | Domokos | G06Q 30/0201 |
| 2019/0333054 A1* | 10/2019 | Cona | H04W 12/06 |
| 2020/0034884 A1* | 1/2020 | Ramanuja | G06Q 30/0254 |
| 2020/0134492 A1* | 4/2020 | Copeland | G10L 15/1822 |
| 2020/0285980 A1* | 9/2020 | Sharad | G06N 20/20 |
| 2021/0067339 A1* | 3/2021 | Schiatti | G06F 16/27 |
| 2021/0150037 A1* | 5/2021 | Radhakrishnan | G06F 21/602 |
| 2021/0150269 A1* | 5/2021 | Choudhury | G06V 30/1985 |

OTHER PUBLICATIONS

Konečný, Jakub, et al. "Federated optimization: Distributed machine learning for on-device intelligence." arXiv preprint arXiv:1610.02527 (2016), pp. 1-38 (Year: 2016).*
Galtier, Mathieu N., et al. "Substra: a framework for privacy-preserving, traceable and collaborative machine learning." arXiv preprint arXiv:1910.11567 (Oct. 25, 2019), pp. 1-22 (Year: 2019).*
Kawa, Deep, et al. "Credit risk assessment from combined bank records using federated learning." International Research Journal of Engineering and Technology (IRJET) 6.4 (Apr. 2019): pp. 1355-1358 (Year: 2019).*
Li, Tian, et al. "Fair resource allocation in federated learning." arXiv preprint arXiv:1905.10497 (May 25, 2019) (Year: 2019).*
Wang, Guan, et al. "Measure Contribution of Participants in Federated Learning." arXiv preprint arXiv:1909.08525 (Sep. 17, 2019), pp. 1-8 (Year: 2019).*
U.S. Appl. No. 15/456,059, filed Mar. 10, 2017.
U.S. Appl. No. 16/891,827, filed Jun. 3, 2020.
U.S. Appl. No. 16/127,933, filed Sep. 11, 2018.
U.S. Appl. No. 62/748,287, filed Oct. 19, 2018.
U.S. Appl. No. 62/698,769, filed Jul. 16, 2018.
U.S. Appl. No. 16/127,933 filled Sep. 11, 2018.
McMahan, Brendan et al., "Federated Learning: Collaborative Machine Learning without Centralized Training Data," Google AI Blog, Apr. 6, 2017, https://ai.googleblog.com/2017/04/federated-learning-collaborative.html.
Konečný, Jakub et al., "Federated Optimization: Distributed Optimization Beyond the Datacenter," arXiv:1511.03575 Nov. 11, 2015, https://arxiv.org/abs/1511.03575.
Brownlee, Jason, "Basic Feature Engineering with Time Series Data in Python," Machine Learning Mastery Blog Dec. 14, 2016. https://machinelearningmastery.com/basic-feature-engineering-time-series-data-python/.
Gamboa, John Cristian Borges, "Deep Learning for Time-Series Analysis," Jan. 7, 2017, arXiv:1701.01887, https://arxiv.org/abs/1701.01887.
Yuan, Yexi, "Recency, Frequency, Monetary Model with Python—and how Sephora uses it to optimize their Google and Facebook Ads," Towards Data Science, Aug. 17, 2019, https://towardsdatascience.com/recency-frequency-monetary-model-with-python-and-how-sephora-uses-it-to-optimize-their-google-d6a0707c5f17.

* cited by examiner

FEDERATED MACHINE-LEARNING PLATFORM LEVERAGING ENGINEERED FEATURES BASED ON STATISTICAL TESTS

CROSS-REFERENCE TO RELATED APPLICATIONS

This patent claims the benefit of U.S. Provisional patent Application 62/943,511, filed 4 Dec. 2019, titled Federated Customer Journey Analytics Platform Leveraging Behavior Relevant Learning. The entire content of this application is hereby incorporated by reference for all purposes.

BACKGROUND

1. Field

The present disclosure relates generally to predictive computer models and, more specifically, to a federated machine-learning platform leveraging engineered features based on statistical tests to support heterogeneous data sources, sub-models, and governance constraints among participants in the federated machine-learning platform.

2. Description of the Related Art

Centralized machine learning is often inaccessible for many businesses. Data usually exists in the form of isolated silos within a company or across companies. This is typical because of the lack of data or lack of confidence in the data. It is often difficult to break the barriers between different data sources, particularly those spanning different technical architectures or across companies.

Federated learning is a distributed machine learning framework that allows a collective model to be constructed from data that is distributed across data owners, without each participant necessarily having access to the data upon which other participants train (or input to during run-time) their sub-models that constitute the federated learning model. Federated Learning (FTL) can be used in some cases to improve statistical models by allowing knowledge to be shared without compromising user privacy and enable complementary knowledge to be transferred in the network. As a result, a target-domain party may build more flexible and powerful models by leveraging rich labels from a source-domain party. However, the excessive computational overhead of the security protocol involved in this model renders it impractical for many configurations, none of which is to suggest that these or any other approaches are disavowed or disclaimed.

SUMMARY

The following is a non-exhaustive listing of some aspects of the present techniques. These and other aspects are described in the following disclosure.

Some aspects include a process including; receiving a data token to be passed from a first node to a second node; retrieving machine learning model attributes from a collection of one or more of the sub-models of a federated machine-learning model; determining based on the machine learning model attributes, that the data token is learning relevant to members of the collection of one or more of the sub-models and, in response, adding the data toke to a training set to be used by at least some members of the collection of one or more of the sub-models; determining a collection of data tokens to transmit from the second node to a third node of the set of nodes participating in a federated machine-learning model; and sharing the collection of data tokens.

Some aspects include a tangible, non-transitory, machine-readable medium storing instructions that, when executed by a data processing apparatus, cause the data processing apparatus to perform operations including the above-mentioned process.

Some aspects include a system, including one or more processors, and memory storing instructions that, when executed by the processors, cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
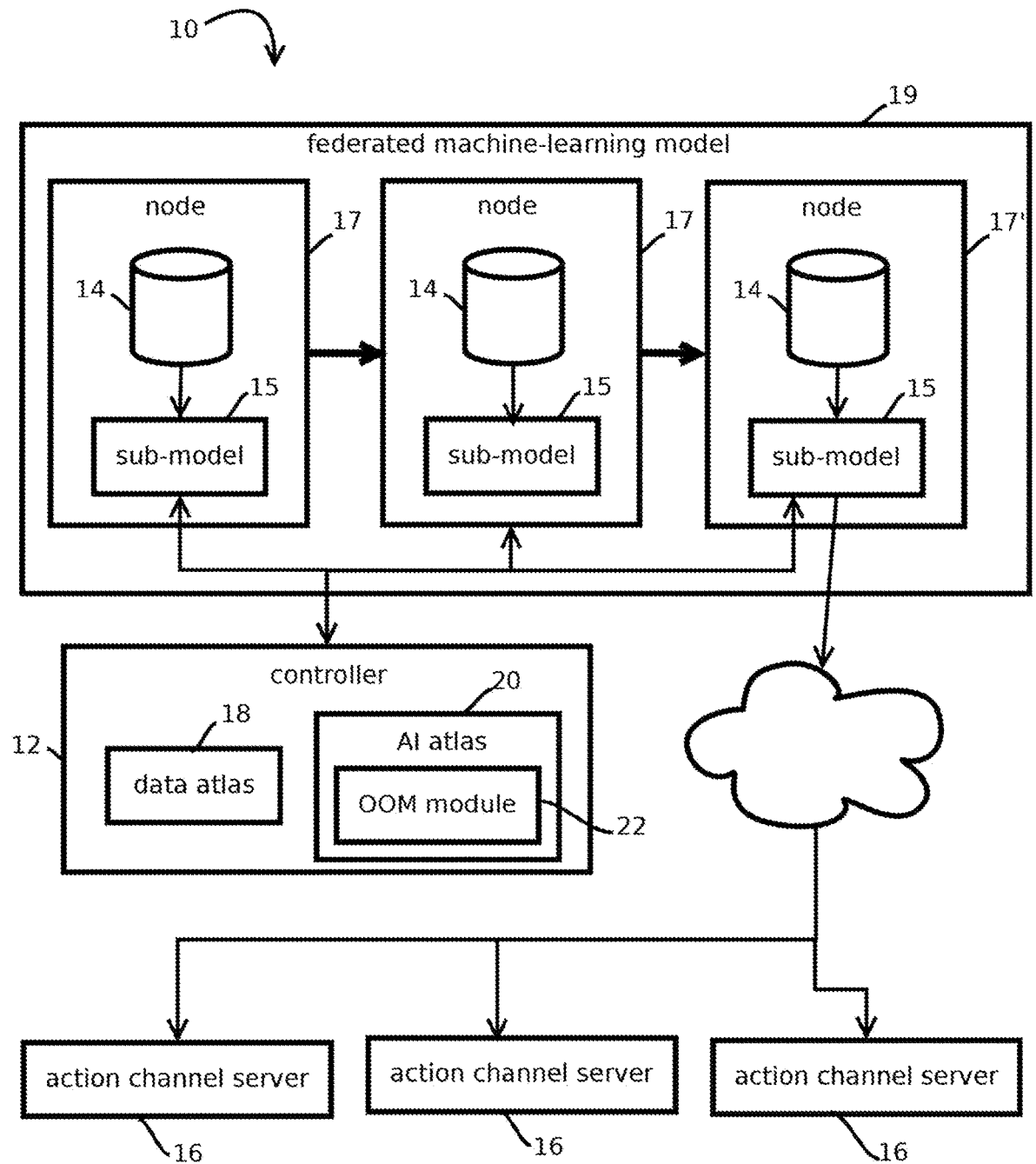
FIG. 1 is a block logical and physical architecture diagram showing an embodiment of a controller in accordance with some of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of data science and distributed complex event processing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Many types of federated learning are not suitable for real-time operations, like complex event processing and other forms of machine learning in which time (or other indica of sequence) is a relevant feature. Complex pipelines in such models, with separately optimized zones (e.g., sub-model parameters adjusted during separate training processes on different training sets) are often not well suited for active learning or iteration of model architecture. Data ingestion processes to extract, transform, and load (ETL) input data often vary in material ways among the different processes participating in a federated model, making it difficult to draw correct inferences across the set of federated processes supporting the federated machine learning model, as each process may treat the same data differently during ETL. Data freshness and granularity often vary for the same types of data being ingested by different federated processes implementing the federated machine learning model, which makes it difficult to select a single active learning rate for all participates in the federated machine learning model. Diversity of longitudinal datasets among participants creates similar issues, when trying to select a one-size fits all hyperparameters or model architecture for a federated machine learning model.

To mitigate some of these challenges, and in some embodiments all of them and others, some embodiments determine, and dynamically re-assess during run time (or a single time during model design), the relevance of data (e.g., some or all) upon which inputs to the federated machine learning model are based (e.g., the inputs themselves, or parameters of engineered features that are inputs to the model) to the performance (e.g., accuracy, precision, or F2 score) federated machine learning model or to suitability of that model or sub-models (e.g., at different federated processes) to transfer learning. Relevance may be determined with a variety of measures, including various statistical tests like T-student, Chi square, Mahalanobis distance, Shapley values, local interpretable model-agnostic explanations (LIME), cross-entropy, and the like, to assess the relevance of inputs to the federated machine learning model to performance or transfer learning.

Some aspects of this disclosure relate generally to predictive computer models and, more specifically, to the creation and operation of numerous machine learning and other artificial intelligence (AI) models in a form that allows leveraging those models across multiple heterogenous data sources, multiple heterogenous machine learning models and repositories, even when these are widely different in scope, data model, data set update rate, and privacy constraints and other forms of operational governance, in some cases, allowing federated and transfer learning modalities easily adapted, modified, and audited by data scientists and analysts alike.

Some embodiments include a federated learning platform that can be used by multiple entities that do not wish to share raw data (e.g., different businesses or other enterprises) to collaborate mutually and build robust models. Data sharing may be achieved either by building a meta-model from the sub-models each party (e.g. an enterprise) builds so that only model parameters are transferred or by using encryption techniques to allow safe communications in between different parties. In some cases, the platform includes code that is distributed and executed on computing devices of different participants in the federated machine learning model and code that is executed on computing devices of a third party that coordinates computations among processes executed by those participants. Or in some cases, embodiments may include entirely centralized or entirely decentralized architectures, with only one of these parties having computing devices performing some or all of the types of computations described herein.

In some incarnations, federated learning is a distributed machine learning framework that allows a collective model to be constructed from data that is distributed across (and in some cases, not shared between) data owners. In some cases, data may be scattered across different organizations and may not be easily integrated under many legal and practical constraints. Federated transfer learning (FTL) may be used to improve statistical models under a data federation that allow knowledge to be shared without compromising user privacy and facilitate complementary knowledge to be transferred in the network. As a result, a target-domain party (e.g., one without access to the data of some or all of the participants in the federated machine learning model) may build more flexible and powerful models by leveraging rich labels from a source-domain party.

In some embodiments, data privacy security, impact of terms of service, or administrative policies may be leveraged in data integration between different entities or departments of the same entity. General Data Protection Regulation (GDPR) enforced by EU to protect data security & privacy enacted in 2018, China's Cyber security law & General principles of civil law enacted in 2017, and California Consumer Privacy Act enacted in 2018 are some of the examples of restriction on data usage. Various other data governance constraints may similarly affect which model architectures are acceptable, including regulations on sharing data regarded as proprietary, like trade secrets.

To help with privacy and other data governance constraints, Cerebri AI of Austin, Texas introduced a form of federated learning in the way of logging exchanges in U.S. Pat. No. 10,484,343 DISTRIBUTED LOGGING FOR SECURING NON-REPUDIABLE MULTI-PARTY TRANSACTION, the entire contents of which are hereby incorporated by reference. The federated learning architecture in this patent may be used in conjunction with the techniques described herein, in some embodiments.

FIG. 1 is a schematic block diagram of an example of a controller 12, operating within a computing environment 10 (e.g., a network of computers or other type of computer system), in which aspects of some of the present techniques may be implemented. A variety of different computing architectures are contemplated. Controller 12 is shown in a software-as-a-service (SaaS) configuration, but in some cases, some or all of the different nodes 17 may have a local instance operating in a distributed fashion. In some embodiments, some or all of the components of the computing environment 10 may be hosted by different entities. In some embodiments, the computing environment 10 and the components thereof may be implemented as a monolithic application, for instance, with different illustrated components implemented as different software modules or processes that communicate with one another, for instance via function calls, or in some cases, some or all of the components may be implemented as different processes executing concurrently on a single computing device. In some embodiments, some or all of the illustrated components may be implemented as distinct services executing on different network hosts that communicate with one another via messages exchanged via network stacks of the respective hosts, for instance, according to application program interfaces of each of the distinct services. In some embodiments, some or all of these services may be replicated, for instance, behind load balancers, to afford a relatively scalable architecture, in some cases, with elastic scaling that automatically spins up or down new instances based on load. Some embodiments implement a service-oriented architecture, such as a micro services architecture, with different services hosted on virtual machines or containers executing images corresponding to different services, in some cases, with some services implemented in a serverless architecture, for instance, as lambda functions.

In some embodiments, the computing environment 10 may include multiple datasets (e.g. event records) 14 of multiple nodes 17 (e.g., computing systems with constraints on data sharing) of a federated machine learning model 19. The nodes 17 may have sub-models 15 that take as inputs or training data input from datasets 14 and form a federated machine learning model pipeline (or other topology, like a tree structure in an ensemble model that merges branches at node 17') that operates in service of node 17', which may use the outputs of the federated machine learning model 19 to determine to effect various actions via the action-channel servers 16. In some embodiments, the controller 12 may implement the processes described below to mitigate some of the challenges with federated learning in real time complex event processing, e.g., by coordinating among the sub-models 15 to configure and dynamically adjust the federated machine learning model 19. Three sub-models are show, by embodiments are expected to include substantially more in some use cases, e.g., more than 10 or 50, in some cases with heterogenous model architectures (examples of which are described below and in the documents incorporated by reference). The controller 12 may include a data atlas 18 and an artificial intelligence (AI) atlas 20. The data atlas 18 may be configured to ingest third-party machine learning models (or other forms of AI models), like sub-models that constitute a federated machine learning model. In some cases, each of those sub-models may specify a model architecture (like a network of perceptrons in a neural network, such as a directed graph indicating which perceptron's outputs feed into which perceptron's inputs, or other types of models discussed below), model parameters in a trained or untrained state (e.g., weights and biases of the perceptrons), and hyperparameters of the model. In some cases, sub-models may be obtained from a plurality or all (e.g., more than 2, 3, 20, or 50) different entities. The data atlas may cause various AI pillars described below, like Cerebri value from the patent filings incorporated by reference and the various statistical tests described below, to be applied to those ingested sub-models, and the result may be passed to the AI atlas 20, which may transform the result into various behavior learning relevant factors discussed below.

In some embodiments, datasets 14 may be obtained from various entities (e.g. enterprises) and may include entity events (e.g., those involving the entity, like where the entity acted upon or was acted upon by a system being modeled, like a customer) and non-event attributes related to those events (e.g., exogenous events, like the weather, news events, holidays, etc.). Event records 14 may include targeted actions (e.g., desired outcomes of the entity operating the federated machine learning model, like revenue generating events with customers), non-targeted actions, or both.

In some embodiments, datasets obtained from the entities mat be raw datasets including all the available information that an entity may share with other entities in a data federation. In some embodiments, the entities may preprocess and filter their information in a data federation to allow knowledge to be shared with other entities without compromising user privacy and enable complementary knowledge to be transferred in the network. In some cases, the datasets 14 have the properties discussed above that make some other forms of federated learning difficult, e.g., heterogenous update frequencies, schemas, granularity, ETL processes, etc., and the datasets 14 in some cases are not shared between the nodes 17 (e.g., in part or in whole).

Some of the events may involve a transaction between a customer and a supplier. For example, an event may include a customer receiving a catalog, brochure, or other mailer via mail (or email). Another event may include a customer visiting a web site of the supplier to research one or more items. An event may include the customer chatting (e.g., online or in-person) with a customer service representative (CSR) or other sales representative. An event may include a customer purchasing an item.

In some embodiments, an event may be part of a time-series of events experienced by the corresponding subject entity, such as person, robot, industrial process, or datacenter. Examples include extending credit, offering subsidized hardware to support a subscription, offering insurance, sending an email, causing an advertisement exposure, offering a voucher, offering a seat on an airplane for a specific leg of travel, the assignment of finite resources, sending a coupon or discount offer, calling a person, sending a text message, adjusting a price for a particular person, or adding a task to a customer-relationship management (CRM) system.

In some embodiments, the time series of events are stored in a format that indicates a sequence of the events, for instance with timestamps of each event, or some embodiments may indicate sequence but not time, which is not to suggest that any other described feature is limiting. In some embodiments, the number of events may be relatively large, such as more than 10, more than 100, or more than 1000 on average for the collection of subject entities.

In some embodiments, the events may further include exogenous events, which are events that are not caused by the nodes 17 or the subject entity to which a record pertains, but to which the subject entity is exposed or potentially exposed. Examples include phenomena like the weather, ocean currents, and contact by sea creatures in the example of a subsea robot. Other examples include phenomena like recessions, changes in interest rates, and other macro-economic phenomena, along with cultural phenomena, like sporting events, holidays, the Olympics, elections, and the like in the example of members of a human population to be influenced. In some embodiments, the exogenous events are stochastic, and some embodiments may associate with exogenous events an estimated or known probability distribution, like likelihoods of occurring within threshold durations of time.

In some embodiments, some of the events may further include non-event attributes of the subject, like a maximum amount of thrust available in a subsea robot, a range of thruster angles available in such a robot, drag of the robot, and inertial properties of a tether. In another example, the attributes may include attributes of people, like psychometric or demographic attributes, like age, gender, geolocation of residence, geolocation of a workplace, income, number and age of children, whether they are married, and the like.

In some embodiments, datasets 14 may be updated in real time as new events take place. Datasets may be updated at similar or different rates (e.g. 500 milliseconds, hourly, daily, or weekly). Events and non-event attributes may be updated at a similar or different rates. For example, events may be updated on hourly basis and the corresponding non-event attributes may be updated on a daily basis. In some cases, different In some embodiments, the controller 12 may be configured to cooperate with nodes 17 execute the process 100 described below with reference to FIG. 2. In some embodiments, different subsets of this process 100 may be executed by the illustrated components of the controller 12, so those features are described herein concurrently. It should be emphasized, though, that embodiments of the process 100 are not limited to implementations with the architecture of FIG. 1, and that the architecture of FIG. 1 may execute processes different from that described with reference to FIG. 2, none of which is to suggest that any other description herein is limiting. In some cases, controller 12 has access to the data of the nodes 17, and in some cases, controller 12 does not (but does have access to the sub-models 15).

Figure 2:
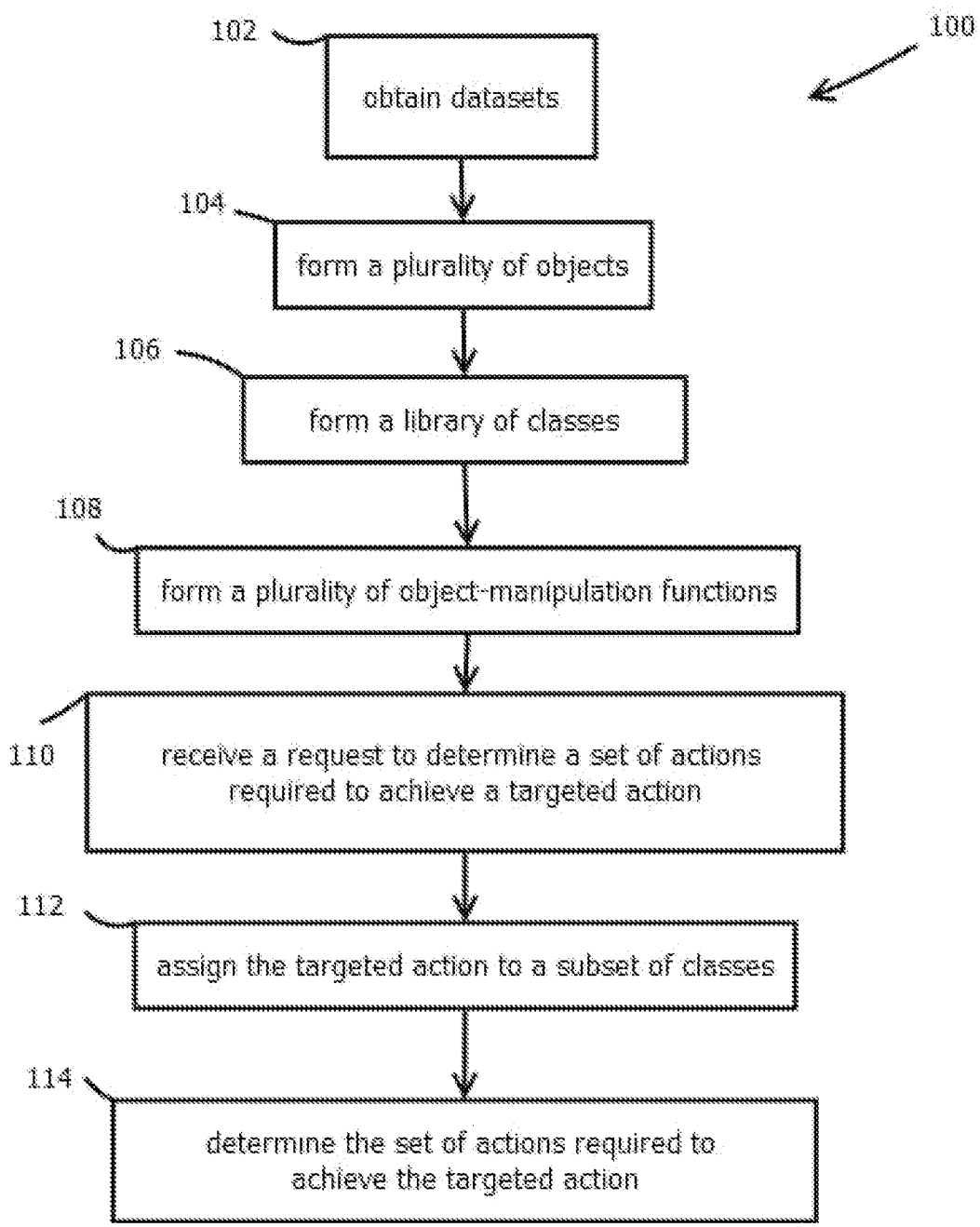
FIG. 2 is a flowchart showing an example of a process by which a targeted action is determined using Federated Customer Journey Platform in accordance with some of the present techniques.

In some embodiments, the process 100 includes obtaining, as indicated by block 102 in FIG. 2, for a plurality of entities, datasets. The datasets may be events or attributes involving the entities. In some embodiments, at least a subset of the events are actions by the entities and some of these actions may be targeted actions.

In some embodiments, the controller 12 may include a data atlas 18 and an AI atlas 20, as shown in FIG. 1. In some embodiments, a plurality of objects may be formed, as indicated by block 104. In some embodiments, the data atlas 18 may transform datasets into objects, and the AI atlas 20 may transform these objects into results that can be used by the entities. These results may be score, indexes, lists, ranked order lists among others. In some embodiments, these results may be produced using the techniques described in U.S. patent application Ser. No. 15/456,059, titled BUSINESS ARTIFICIAL INTELLIGENCE MANAGEMENT ENGINE, and U.S. patent application Ser. No. 16/891,827, titled OBJECT-ORIENTED AI MODELING, the contents of which are hereby incorporated by reference.

In some embodiments, the datasets 14 may go through an ingestion process in the nodes 17, which in some cases, may be different processes in different nodes (e.g., data may be binned differently, like on a weekly or monthly basis, and data may be updated differently), where some of the following functions may take place: data and schema drift may be controlled, file headers may be checked, version numbers may be added to incoming files, data may be routed into clean/error queues, data files may be archived in their raw format, error records may be cleaned, column types may be changed from string to specific data types, incremental data may be processed, data normalization may be done through primary surrogate keys added, de-duplication, referential integrity may be checked, data quality may be checked (DQM) through value thresholds and value format, client specific column names may be formed, data may be encoded in dimensional star schema, column names may be changed from user specific to domain specific, extension tables as key value stores may be added for user specific attributes, data may be changed from dimensional star schema to denormalized flat table, and granularity of data may be adjusted for events, customer-product pairs, and customers.

In some embodiments, the sub-models 15 are configured to ingest data from a dataset 14, which in some cases may include tokens, telemetry data, risk data, third-party data, social data, and customer data. The datasets 14 may be input as a batch or a stream into an extract, transform, and load (ETL) pipeline, which may load the data in a standardized, normalized, validated, and cleansed format in data store. In some embodiments, these records may correspond to the customer journeys described in U.S. patent application Ser. No. 15/456,059, titled BUSINESS ARTIFICIAL INTELLIGENCE MANAGEMENT ENGINE, the contents of which are hereby incorporated by reference.

In some embodiments, datasets may be preprocessed by the nodes 17, before being shared with the other nodes 17, to not reveal more than a threshold amount of information about the data. The threshold may be set based on entities' cybersecurity posture, internal policies, or to the extent that the data may be useful for other entities (e.g. a user ID assigned to a customer may not be useful data for other entities.)

In some embodiments, the sub-models 15 are trained on the respective datasets 14, e.g., in distinct optimizations, like stochastic gradient descent, simulated annealing, genetic optimizations, or the like, in distinct greedy optimizations relative to the other sub-models, e.g., at different times, on different data sets. The sub-models may then operate on newly received data, like a stream of events, with the trained model to produce outputs that then flow to a next sub-model in the federated machine-learning model 19 before resulting in an action by node 17'.

In some embodiments, the datasets 14 are transformed into objects by labeling the data. Labels maybe created using machine learning techniques or object oriented modeling. In some embodiments, labelling includes adding tags to data. Augmenting data with labels may make it more informative and more manageable. One use of labelling in object-oriented modeling may be management of labels, not as elements in a list or table, but as objects allowing a collection of tags to be used. As objects, OO-labels may be managed and organized through enforced set of grammar and semantic rules. In some embodiments, such labels are leveraged to find the most relevant data amongst all the datasets available in a data federation.

The machine learning techniques that may be used in this system include the following: Ordinary Least Squares Regression (OLSR), Linear Regression, Logistic Regression, Stepwise Regression, Multivariate Adaptive Regression Splines (MARS), Locally Estimated Scatterplot Smoothing (LOESS), Instance-based Algorithms, k-Nearest Neighbor (KNN), Learning Vector Quantization (LVQ), Self-Organizing Map (SOM), Locally Weighted Learning (LWL), Regularization Algorithms, Ridge Regression, Least Absolute Shrinkage and Selection Operator (LASSO), Elastic Net, Least-Angle Regression (LARS), Decision Tree Algorithms, Classification and Regression Tree (CART), Iterative Dichotomizer 3 (ID3), C4.5 and C5.0 (different versions of a powerful approach), Chi-squared Automatic Interaction Detection (CHAID), Decision Stump, M5, Conditional Decision Trees, Naive Bayes, Gaussian Naive Bayes, Causality Networks (CN), Multinomial Naive Bayes, Averaged One-Dependence Estimators (AODE), Bayesian Belief Network (BBN), Bayesian Network (BN), k-Means, k-Medians, K-cluster, Expectation Maximization (EM), Hierarchical Clustering, Association Rule Learning Algorithms, A-priori algorithm, Eclat algorithm, Artificial Neural Network Algorithms, Perceptron, Back-Propagation, Hopfield Network, Radial Basis Function Network (RBFN), Deep Learning Algorithms, Deep Boltzmann Machine (DBM), Deep Belief Networks (DBN), Convolutional Neural Network (CNN), Stacked Auto-Encoders, Dimensionality Reduction Algorithms, Principal Component Analysis (PCA), Principal Component Regression (PCR), Partial Least Squares Regression (PLSR), Collaborative Filtering (CF), Latent Affinity Matching (LAM), Cerebri Value Computation (CVC) Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), Ensemble Algorithms, Boosting, Bootstrapped Aggregation (Bagging), AdaBoost, Stacked Generalization (blending), Gradient Boosting Machines (GBM), Gradient Boosted Regression Trees (GBRT), Random Forest, Computational intelligence (evolutionary algorithms, etc.), Computer Vision (CV), Natural Language Processing (NLP), Recommender Systems, Reinforcement Learning, and Graphical Models.

In some embodiments, AI atlas or the nodes 17 may include a class-based Object-Oriented Modeling (OOM) module 22. In some embodiments related to OOM, a class may be a program-code or program-data template used to create objects, which in some cases, may serve as features input to the various models described herein and, in some cases, may be shared among participants of the system of FIG. 1.

In some embodiments, OOM module 22 may implement various functions that includes one or more of: abstraction, aggregation, arbitrator, association, accessor, optimization, auditor, binding, orchestration, composition, composition sheets, composition association, Concurrent Ontology Labelling Datastore (COLD), taxonomy, contextualization, cross-contextualization, dataset, dataset association, data streams, encapsulation, governance, inheritance, labelling, messaging, modelor, orchestration, policing, policors, object-oriented modeling (OMM), object-oriented quality management (OQM), object-publish-subscribe modeling (OPSM), pipelining, realization, targeting, and winnowing.

In some embodiments, OOM module 22 may use ontology semantics by leveraging feature engineering to classify and sort different types of features (e.g. events and non-event attributes) from different entities. Feature engineering may include recency feature engineering, frequency feature engineering, lag feature engineering, difference feature engineering, harmonic analysis feature engineering.

Recency features leverage the last time an event took place. In some embodiments, the recency features are calculated by counting a number of time units (days, minutes) since the last time an event type (or abstracted event type based on an ontology) occurred. In some embodiment, event types that are taken place within a specific time window can be combined into a single event. This is helpful when multiple activities are recorded as part of a single service event (like the different tasks of a service appointment) or multiple objects in a single purchase event.

Frequency features capture how often a specific event type or multiple event types (as a combination) occurs in the defined time window for the problem. In some embodiments, frequency features are calculated by summing of interaction events occurring in a pre-defined (or dynamically defined) or optimized aggregation window.

Lag feature engineering may be used by organizing timelines into periods. In some embodiments, periods have a constant duration. In some embodiments, periods have varied durations (to accommodate holydays for instance). In some embodiments, the system adds one or more event occurrence of a previous period to the period of choice. Lag feature engineering may be combined with another feature engineering. In some embodiments, the rolling, expanding, frequency and recency features could be lagged along with non-lagged features.

Figure 3:
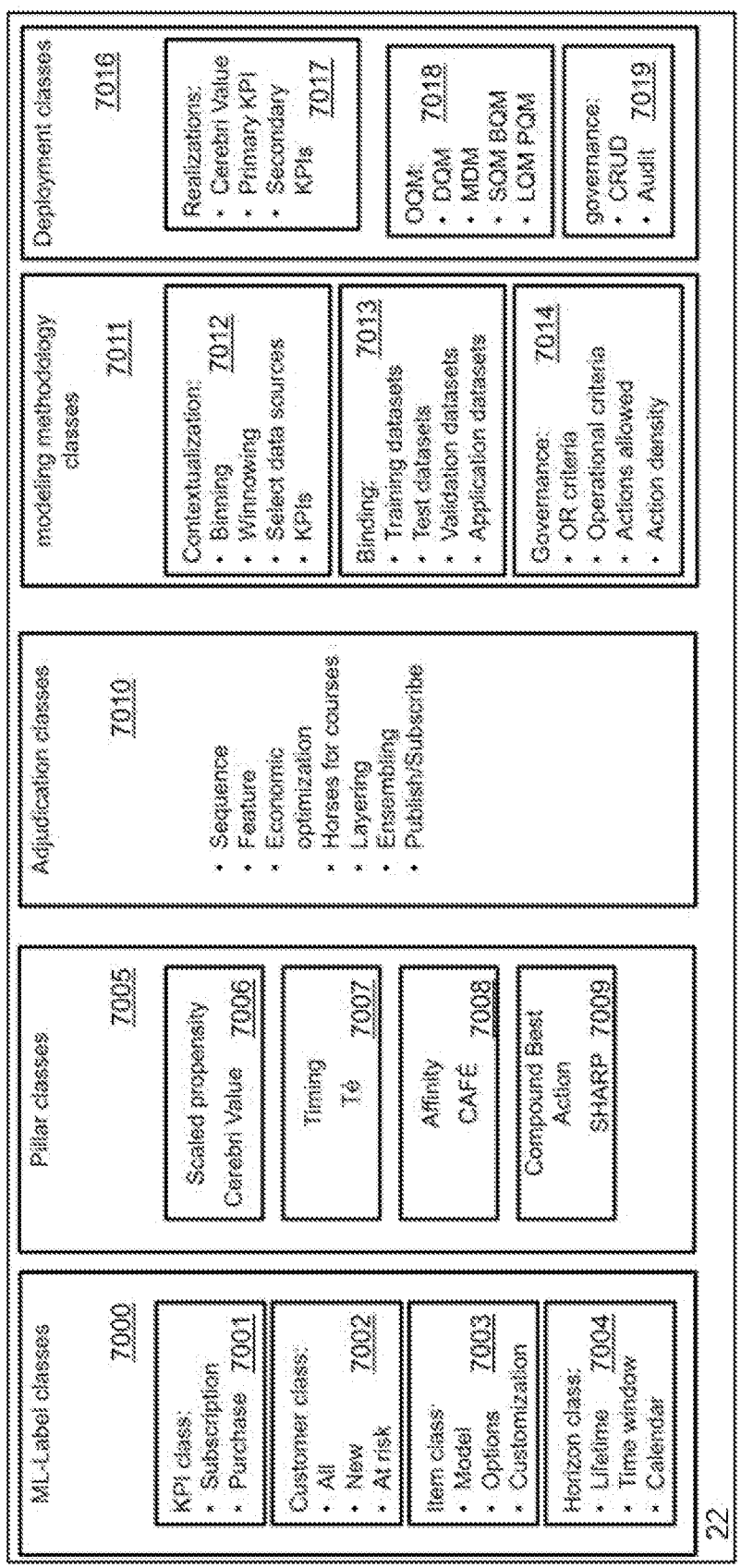
FIG. 3 is a block diagram showing an embodiment using OOM classes in accordance with some of the present techniques.

In some embodiments, a library of classes may be formed, as indicated by block 106 in FIG. 2. Examples of some of the classes of OOM module 22 are illustrated in FIG. 3. These classes may be used to leverage federated learning and Behavior Learning Relevance (BLM), in accordance with some of the embodiments of the present disclosure. Also, a plurality of object-manipulation functions may be formed as indicated by block 108. Each of the object-manipulation objects may be configured to leverage a specific class. In some embodiments, machine learning techniques may be used to calculate a set of scores indicative of interdependency of the plurality of object-manipulation functions. An interdependency graph of the object-manipulation functions may be formed using the calculated scores.

In some embodiments, the datasets may be labeled with ML-labels are shown in the ML-label class library 7000. A Key Performance Indicator (KPI) class 7001 may be used to manage the business problems. Examples of KPIs may include subscription, purchase, churn, assignment, or acquisition. A customer class 7002 may capture the business and life-cycle of customers whether consumers (for B2C) or businesses (for B2B). They may include at risk customers, or all customers. An item class 7003 may define commercial items. These items may be physical goods (e.g., cars) or services (e.g., wireless phone contracts). In some embodiments, these items may be ranked hierarchically. That hierarchy or unstructured metadata may be set through classes, such as models, options, and customization. In some embodiments, the hierarchy may be a taxonomy hierarchy. A horizon class 7004 may capture life cycle or targeted lifetime of business related activities in a form of a starting date, a time window or a calendar (e.g. seasonality).

In some embodiments, a class of modelors may be an example of what is referred to as pillars. Pillar classes may support elements of machine learning systems.

In some embodiments, a pillar class library 7005 may include scaled propensity (e.g. Cerebri Value) 7006, timing class (e.g. Te) 7007, affinity class (e.g. CAFE) 7008, and compound best action class (e.g. SHARP) 7009. Pillars may be a class of modelors that may purport to support elements of machine learning systems. Pillar classes may answer questions such as:

I. Who will engage in an action,
II. Commitment or loyalty to a brand,
III. Commitment to spend,
IV. Commitment to tenure (and counter churn away),
V. Timing propensity of engagement,
VI. Affinity for choices of engagement (including location and channel) from selections,
VII. Affinity for choices of engagement for synthesized selections,
VIII. Action to be set engagement,
IX. Clustering of attributes or behaviors,
X. Classification, and
XI. Product or service recommendations.

In some embodiments, a scaled propensity modelor may be a modelor object of the probability of a consumer making an economic commitment. This scaled propensity is an indicator of inherent commitment of a customer to a service or product brand. When bound with a dataset, the result modeling object may be computed according to various techniques, such as the ones provided in U.S. patent application Ser. No. 16/127,933, the contents of which are hereby incorporated by reference. A Té modelor may be used to calibrate the moments in time when specific consumer is likely to engage with specific activities. The resulting models may be used for churn management or marketing campaigns. Non-exhaustive examples of encoding are provided in U.S. Patent Application 62/748,287, the contents of which are hereby incorporated by reference. An affinity modelor may be employed to capture ranked likes and dislikes of customers for specific items. These items may be, among others, items, services, channels, agents, terms of contracts, banking and loans configurations. A best action modelor may be used to create a framework for concurrent KPI compound best actions at different points in customer journeys.

In some embodiments, datasets obtained from multiple entities may be combined together to facilitate or otherwise improve the quality of joint or independent decision-making. To do so, they often face obstacles of aggregating the information each of the entities own or otherwise hold, which constrains the space of suitable computing architectures. These constraints may arise from a variety of concerns, including regulatory compliance or business issues. In some cases, the entities may be different organizations, or in some cases, the entities may be within the same organization. In some cases, the entities process data concurrently, or in some cases, the entities process data at different times.

In some embodiments, a cluster modeling module may also be used to group customers based on behavior into finite list for further processing. In some cases, the expected spend in one business may be correlated with expended spend in related businesses (say car and car loan, say airlines and hotel, say credit card payments and using airlines loyalty points). This means the expected spend over products, time and location may be tokenized (e.g. an object or a label). This token may be used as data to be passed between models or metadata to control operation of models (alone or federated). In some cases, expected spend (which varies over time) is a measure of behavior (e.g. customer engagement). Behavior is a higher level of insight about a customer compared to data or model parameter.

In some embodiments, some of the datasets may be updated in real time to capture new events and attributes. In some embodiments, the cluster modeling module may be used to leverage specific groups of customers to only process and ingest more relevant data and focus on the situation at hand. In some embodiments, the cluster modeling module may dynamically leverage the most relevant data (e.g. events and attributes) based on the current goals of an entity. This can reduce the computational load of learning about customers' behavior.

In some embodiments, meta-models (models of models, models fitting models, jointly optimized models) are created, using metadata and tokens that represent all or part of models, to construct customer journeys that span multiple entities (internal departments, P&L centers in a multinational, or different companies or groups), such customer journeys like those described in U.S. patent application Ser. No. 15/456,059, titled BUSINESS ARTIFICIAL INTELLIGENCE MANAGEMENT ENGINE, the contents of which are hereby incorporated by reference.

In some embodiments, the token may contain the rule for processing both from a business perspective (who has the right to use and the nature of the use) or technical perspective (what is the best way to combine/aggregate/confront the output of the models.)

Some embodiments may integrate with blockchain, monetization, and cost management techniques.

Deposition of design process and operation of models, developed using OOM into objects, may facilitate efforts to cause quality to be embedded in objects. Quality may be attributes of objects. Modeler, bound modelors, and pipelines may be managed through multiple lifecycles rather than a single one. In some embodiments, Object-Oriented QM (OQM) may have six components:

I. Data quality monitoring (DQM): DQM measures, not necessarily exclusively (which is not to suggest that other lists are exclusive), new or missing data source (table) or data element, counts, null count and unique counts, and datatype changes. DQM may be used to figure out which data sources are reliable.

II. Model quality monitoring (MQM): MQM may measure, not necessarily exclusively (which is not to suggest that other lists are exclusive), model-based metrics, such as F1, precision, recall, etc., or data, and triggers retraining for drift.

III. Score quality monitoring (SQM): SQM may perform model hypothesis tests, including Welch's t-test (e.g., parametric test for equal means) and the Mann-Whitney U-test (e.g., non-parametric test for similar distributions). SQM may also compute lift tables, a decile table based on the predicted probability of positive class membership, with the cumulative distribution function of positive cases added in. The gain chart is a plot of the cumulative distribution function of positive cases may be included as a function of quantile, decile, or binning.

IV. Label quality monitoring (LQM): Labels may be categorical and bound by semantic rules or ontologies. LQM may be used to understand which data sources are leverageable and impactful. LQM may be used for data debt management and enhancing compositions for performance.

V. Bias quality monitoring (BQM): Bias is a systematic distortion of the relationship between a variable, a data set, and results. Three types of bias may be distinguished: information bias, selection bias, and confounding, in some embodiments.

VI. Private quality monitoring (PQM): Privacy may cover personally identifiable information and access of privileged information.

In some embodiments, an integrated modeling amongst multiple entities may be used to facilitate additional improvements with reduced complexity that improve performance post original design. The pillars may have OQM analysis features, such as feature importance, incremental contribution, Shapley information (like Shapley values, or other measures of network centrality), Gini impurity, entropy, population stability index (PSI), characteristics stability index (CSI), information value (IV), and cross-entropy.

In some embodiments, the pillars may leverage incremental learning based on statistical tests to reduce learning's computation load. T-student, Chi-square, Mahalanobis distance, Shapley, LIME, and cross-entropy may be used to assess which variables and data should be used to retrain models. In some embodiments, incremental learning may be performed in real-time and dynamically as new data (e.g., events and attributes) becomes available. In some embodiments, the pillars may target the more relevant data to reduce the computation load of learning and choose the best actions in a more efficient (e.g., faster or with less required hardware) manner.

In some embodiments, adapting federated learning based on behavior learning is expected to improve both performance and cost of reaching such performance. By transforming data into objects, behavior may be presented in a form of a finite list of objects that may be applied to datasets obtained from different entities and different businesses. Generating the list of objects, presenting datasets from various entities may facilitate federated learning. An aspect of this disclosure is to use quantified behavior, in forms such as objects, labeled dataset, labeled journeys, and classes, as a way to control key elements of federated learning.

Some embodiments may be implemented with various forms of federated learning:

I. Horizontal Federated Learning (HFL): in this category, datasets 14 share the same features but have different space in samples. When applied to customer journeys, HFL means events or features of events or offers applied to different customers (e.g. insurance policy). In some embodiments, federated learning may increase the utilization of features (e.g. events and attributes) by analyzing customers' behavior relevance amongst different entities and datasets.

II. Vertical Federated Learning (VHL): in this category, datasets 14 share the same sample ID space or customers but differ in feature space or events. When applied to customer journeys, VFL means the same customers have an extended set of events in their customer journeys. In some embodiments, federated learning may match customers' journeys, obtained from different datasets, by analyzing by analyzing customers' behavior relevance amongst different entities.

III. Federated Transfer Learning (FTL): in this category, datasets 14 differ both in sample ID (e.g. customers) and in feature space (e.g. events or products). The transfer refers to a model created from one dataset to be applied on another dataset.

Many existing computer models are not well suited for use cases with sparse training data, e.g., cases in which the historical records exhibit relatively few instances of outcomes that are being predicted or signals predictive of those outcomes relative to the number of historical records, complexity of the system being modeled, or need for the system to generalize out of sample. In some embodiments, federated learning may provide a higher level of insight about a customer by leverage datasets obtained from different entities and enriching the historical records.

In some embodiments related to use cases with sparse dataset in which the historical records exhibit relatively few instances of outcomes that are being predicted, detection and recognition of events, via federated learning, may result in finding similar events and non-event attributes related to other entities that may be injected into an event stream of an entity to enrich the dataset and enhance the quality of behavior learning process.

In some embodiments, behavior may be generated by analyzing the propensity, affinity, and capacities (or attribute thereof, or vectorized version there) of customers at different moments in time or situation. Behaviors may be represented by pillars as discrete and continuous variables. Behavior may be used as a control variable or a meta variable for the operation of federated learning.

Some embodiments may assess of how the behavior of one or more customers affect operation of the federated machine learning model 19. This may be performed with factor analysis, such as Shapley, LIME, gradient search and the like. This factor analysis is referred to as BLR analysis (Behavior learning relevance). In one embodiment, BLR analysis is threshold comparison of Cerebri values based no datasets 14. If the Cerebri value is below a threshold, in response, the controller 12 may the corresponding dataset are not merged or homomorphically transformed.

In some embodiments, pillars may use advanced modeling, operation research, optimization, statistical analysis, and data science techniques (e.g., machine learning modeling techniques MLMTs) that may be applied to datasets that have been processed through data atlas 18.

In some embodiments, encapsulation techniques may be used to protect the data and configuration stored in a class from system-wide access. Encapsulation may safeguard the internal contents of a class like a real-life capsule. For example, pillars may be implemented as examples of fully encapsulated classes. Encapsulation is the hiding of data and of methods implementation by restricting access to specific objects. Embodiments may implement encapsulation by keeping the object attributes private and providing public access to accessors, mutators, validators, bindors, contextors, and policors to each attribute.

In some embodiments, one or more pillars may be selected based on business needs. Based on those choices, datasets may be prepared for use by the pillars.

In some embodiments, OOM module 22 may host a library with adjudication classes 7010, including:

I. Sequence: This class of mutators may change a collection of items into a time sequences for processing. In some embodiments, mutators may be objects used to modify the state of an object, while hiding the implementation of exactly how the modifications take place. Mutators may be suited for feature engineering and for source to target mapping.

II. Feature: This class may use accessors to gather one or more ML-feature of a model or modelor, one or more of properties, features, contexts, ML-state components, OO-state and then use the features in another model or modelor object. In some embodiments, accessors may be objects used to ask an object about itself. Accessor objects may be not restricted to properties and may be any public modelor object that gives information about the state of the object.

III. Economic optimization: This class may hold one or more economic objectives and zero or more economic constraints related to a unitary set of objects (e.g. a person, an product, a service) or a finite set of unitary set of objects (e.g. persons and products) or a finite set of unitary sets complemented by geo-temporal domain (e.g. persons and products and labor day in Maryland) and uses an allocation algorithm to maximize the objectives. Examples of objective functions may include margin optimization, revenue, number of items sold, and carried interest. Examples of constraints may include Cerebri Value range, cost of sales, and number of loan officers. Examples of optimization techniques may include Evolutionary algorithms, Genetic Algorithm (GA), simulated annealing, TABU search, harmony search, stochastic hill climbing, particle swarm optimization, linear programming, dynamic programming, integer programming, stochastic programming, and shortest path analysis.

IV. Horses for courses: This class may use accessors to gather and then analyze different performance measures from the OQM attributes of modelors and context thereof to select which modelors out of the set of modelors to use for a specific set of contexts based on maximize quality value computed from elements of OQM. This class may also analyze different performance measures from the OQM attributes of models and context thereof to select which models out of the set of models to use for a specific set of contexts based on maximize quality value computed from elements of OQM.

V. Layering: This class may use accessors to gather and then analyze different measures from the OQM attributes of modelors and OO-features thereof organized along a semantically preset taxonomy or ontology to select which performance measures may be used per OOM-feature for use in a specific set of contexts. This class may also analyze different measures from the OQM attributes of models and OO-features thereof organized along a semantically preset taxonomy or ontology to select which performance measures should be used per OOM-feature for use in a specific set of contexts.

VI. Ensembling: This class may use accessors to gather and then analyze the outputs and combine the decisions from multiple models to improve the overall performance.

VII. Publishing/subscribing: This class may use accessors to gather relevant attributes and organize them according to ontologies and mutators using those attributes.

In some embodiments, OOM module 22 may host modeling methodology classes 7011 to capture some of the key accessors and mutators. Contextualization classes 7012 may include binning (e.g., mapping of continuous attributes into discrete ones), winnowing (e.g., reduction of time span, location foci, and branches in semantic tree), selection of data sources, and selection of KPIs.

In some embodiments, biding classes 7013 may include binding (or other type of association) of, for instance, the four types of datasets (e.g., training, test, validation, and application). The governance classes (7014) may capture the restrictions and business protocols for specific KPIs. They may include OR criteria, operational criteria, actions that are allowed, and action density (e.g., number of actions per unit time).

In some embodiments, OOM module 22 may further host deployment classes 7016. This category of classes may include realizations 7017 including Cerebri Values and numerous KPIs, organized as primary and secondary. Deployment classes 7016 may also include quality measurements 7018 including data quality monitoring (DQM), model quality monitoring (MQM), score quality monitoring (SQM), bias quality management (BQM), privacy quality management (PQM), and label quality monitoring (LQM). Deployment classes 7016 may also include governance classes 7019 including support of client model validation using model documentation, CRUD management of items and their metadata, security control of governance decision maker, QM metric thresholds as constraints for optimizer, data DQM metric threshold evaluation and analysis, data DQM metric creep evaluation through data set detection, data lifecycle with gate points and workflow actions, model MQM metric threshold evaluation and analysis, model MQM metric creep evaluation through model drift detection, model output SQM metric threshold evaluation and analysis, and model lifecycle with gate points and workflow actions.

In some embodiments, the controller 12 may then be used to select a set of actions to achieve a given targeted action. To this end, some embodiments may receive a request from an entity or a subscriber to determine a set of actions to achieve, or increase likelihood of, a given targeted action as indicated by block 110 in FIG. 2. In some embodiments, the controller 12 may use OOM 22 to assign the targeted action to a subset of classes by leveraging the behavior learning obtained from data federation as indicated by block 112.

Some embodiments may then determine, e.g., by submodel 15 of node 17', the set of actions to achieve (or increase the likelihood of achieving) the given targeted action, as indicated by block 114 and present those set of actions through action-channel servers 16 in FIG. 1.

In some embodiments, the output of the node 17' may effectuate various types of actions that impinge or potentially impinge upon the subjects giving rise to the information in the datasets. In some cases, those actions may be effectuated via various action channel serves 16. In some cases, the role of these components may be filled by a network-connected server configured to send messages (e.g., to computing devices by which humans communicate or to actuators in mechanical systems), in some cases with a different type of messages being sent by each of the different action-channel servers 16, for example, emails sent via email servers, text messages sent via text message servers, messages sent creating tasks in a customer-relationship management CRM system to contact a particular customer, and the like.

In some embodiments, the output of the node 17' may effectuate various types of actions to enhance the performance of businesses and enterprises. Among those, identify likely vehicle repurchasers, accelerate consumers (also referred to herein as customers or users) earning capabilities as well as their redemption of the program i.e. accelerate earn & burn, automatic assignment of client to agent/floor person, best action for identified likely vehicle purchaser to accelerate purchase events, best action for upselling customer to higher class vehicle/more expensive, classify dealers based on quality of loan, cluster customers based on household info and demographic postal code to analyze car purchase/service behavior, income, spending patterns, convert from term life insurance to universal life insurance, convert lease to lease or lease to purchase, corrective recommendation per event type (best action), create and drive triggers and targeted messaging to customers, create behavior driven anthropological cohorts, create incentive for purchase at household level, create lead customers and cohorts for businesses, create leads for repurchase of vehicles, create leads for specific models, create new service plans, design of heuristics (machine learning drives creation of business rules), determine when a second credit card is being used, determine when card rates need to be changed, dynamic credit terms for credit cards, dynamic fee for business, earn and burn, extend range of people to bring car to dealer after 3 years, extend range of people to bring car to dealer before 3 years, faster auto-decline of non-prime loans, find ways to drive a better connection and experience between credit card product and the loyalty programs, including fit to card, based on spend, redemption, behavior and experience, forecast vehicle sales/market share by month, generate best action for recovering customers base on identified event type, identify events in customer journey negative impact, increase brand commitment, identify impact of different series of marketing campaigns, identify likely candidates for renewal of service plan, identify likely candidates for upgrade of service plan, identify likely vehicle purchasers, identify the most effective medium for service renewal, impact of follow up call for recovery of customers, improve book to approve ratio, improve book to look ratio car, improve conversion of new businesses, improve risk adjusted return (RAR) on loan, minimize prepayments, improve the timing and relevancy of communications throughout the journey, incentives to purchase vehicles for customers who are currently leasing, increase automatic approval, increase booking while maintaining the same risk profile, increase booking while reducing delinquency rate, increase loan approval, increase loan approval and booking, increase number of businesses signing for loyalty, lease renewal model, level of discount for purchase, leverage multiple consumers in the same household, loan configuration management, manage cash incentives, mortgage, offer optimization, optimal incentive across a/b/c test, optimization of the bonus/promotion to dealers, optimize money cash back, optimize the move to subscription models, optimizes the onboarding and first 365 days of a new customer, portfolio risk analysis, predict when loan is being flipped, prepayment prediction/velocity, prioritization of processing in manual approval process for underwriting: that is queue management, product definition based on composite/atomic attributes, provide upper bound of incentive to MRSP ratio, rank customers who are likely to return lease and not purchase, rank leads for high cost outbound channels e.g. call center, rank method for call center general reach out (best action), rank upselling customer to higher class vehicle/more expensive, recommend good shepherd payment, recommend redemption, recommendation to engage for service visit, reduce amount of time required to approve a loan, reduce the number of retransmits to approach desk for non-prime loan application, reducing "going dark", ride sharing, selection extended warranty, service package definition, size the universal life insurance premium (ability to save/pay), support the move from an offer driven model to an experience driven model, tailor incentive, tailored offers for customers, total incentive for repurchase, total incentive for repurchase per area, understand the critical factors, events and outcomes of each customer's journey, understand the factors and events throughout the journey of a business prospect from: lead generation>lead qualification>lead nurturing>lead conversion, up-lease to higher class of vehicle/more expensive, when/what underwriter communicating to dealer during stages of the approval process, recommend options for wealth management, reduce abandon of basket.

In some embodiments, the process 100 and the other functionality described herein may be implemented with program code or other instructions stored on a tangible, non-transitory, machine-readable medium, such that when the instructions are executed by one or more processors (a term which as used herein refers to physical processors, e.g., implemented on a semiconductor device), the described functionality is effectuated. In some embodiments, notwithstanding use of the singular term "medium," the medium may be distributed, with different subsets of the instructions stored on different computing devices that effectuate those different subsets, an arrangement consistent with use of the singular term "medium" along with monolithic applications on a single device. In some embodiments, the described operations may be executed in a different order, some or all of the operations may be executed multiple times, operations may be executed concurrently with one another or multiple instances of the described process, additional operations may be inserted, operations may be omitted, operations may be executed serially, recursively, or the processes described may otherwise be varied, again none of which is to suggest that any other description herein is limiting.

The present techniques may be used in the context of the systems and data models described in the following: U.S. Provisional patent Application 62/698,769, filed 16 Jul. 2018, titled DYNAMIC RISK SCORING BASED ON TIME SERIES DATA, U.S. Provisional patent application Ser. No. 15/456,059, filed 10 Mar. 2017, titled BUSINESS ARTIFICIAL INTELLIGENCE MANAGEMENT ENGINE, and U.S. Provisional patent application Ser. No. 16/127,933, filed 11 Sep. 2018, titled MULTI-STAGE MACHINE-LEARNING MODELS TO CONTROL PATH-DEPENDENT PROCESSES. The entire content of each afore-listed earlier-filed application is hereby incorporated by reference for all purposes.

Figure 4:
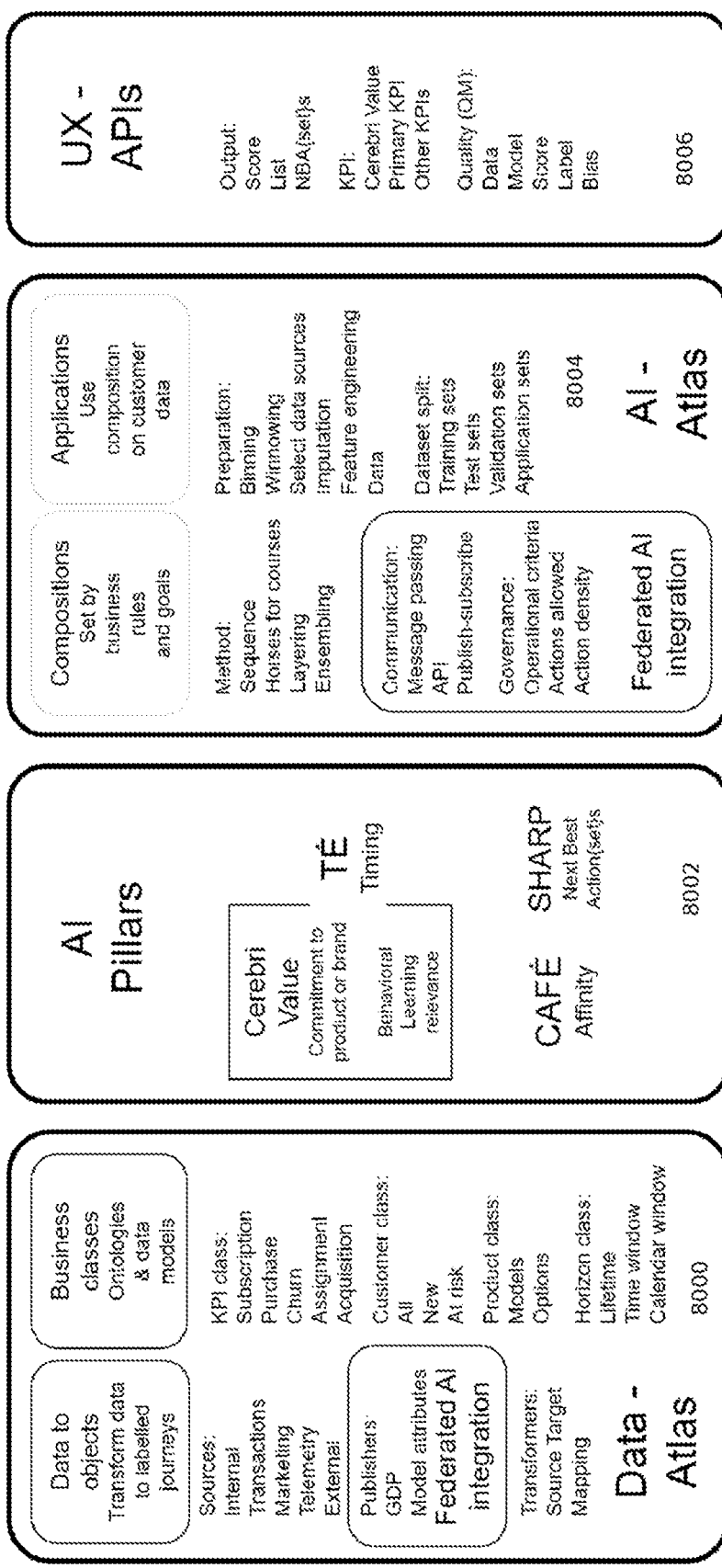
FIG. 4 is a block diagram of an embodiment using behavior learning relevance in accordance with some of the present techniques.

FIG. 4 is a block diagram of a logical architecture in which the present techniques may be implemented in some embodiments. The architecture may include a data atlas 8000, which in some cases may house some or all of the OOM module 22 (rather than or in addition to the AI atlas 20), the above-described AI pillars 8002, the above-described AI atlas 8004, and user experience application program interfaces 8006, which may be used to configure or update the federated machine learning model 19 discussed above. Each module depicted may have some or all of the illustrated functionality.

Figure 5:
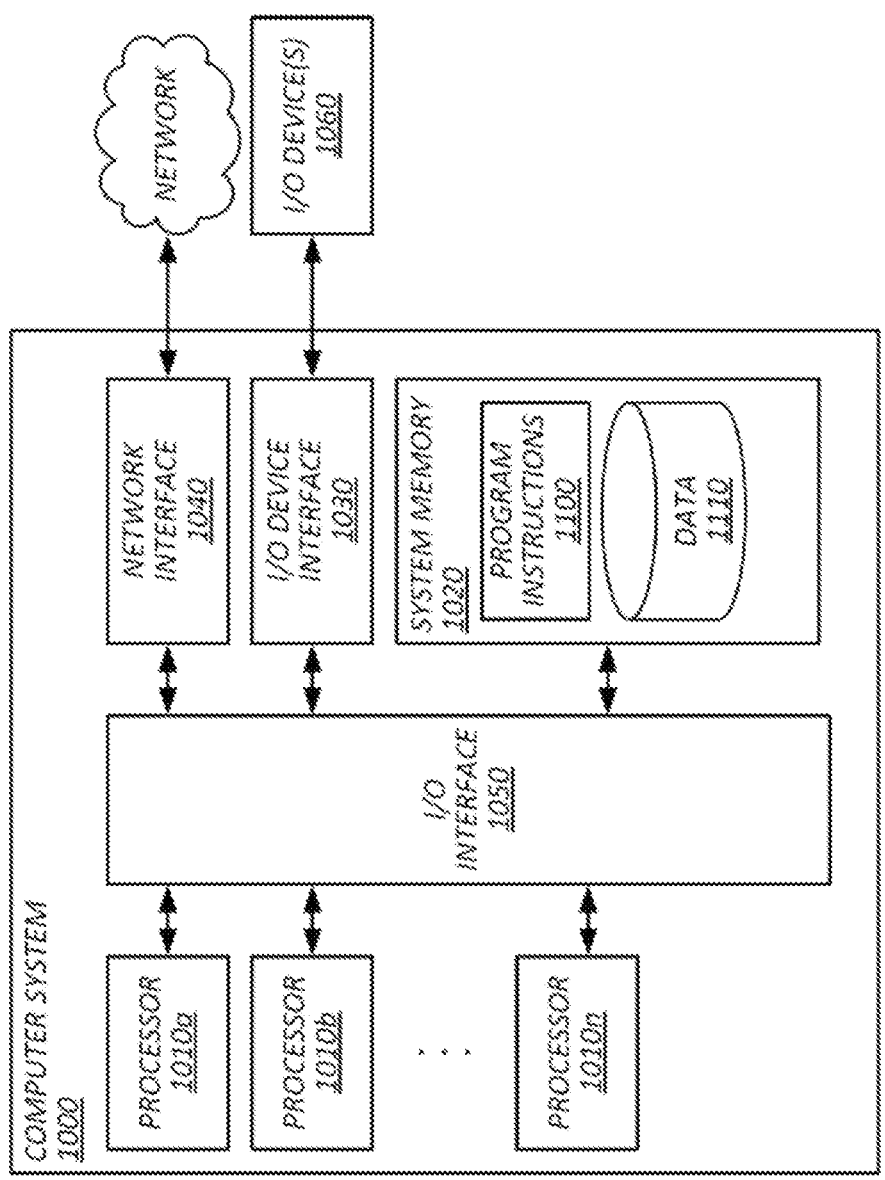
FIG. 5 shows an example of a computing device by which the above-described techniques may be implemented.

FIG. 5 is a diagram that illustrates an exemplary computing system 1000 by which embodiments of the present technique may be implemented. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpindicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference. For example, the statement in the provisional application to which this patent filing claims priority that "[t]he core of this invention is to use quantified behavior as a way to control key elements of federated learning" should be disregarded, as the claims are intended to define the scope of the inventions described herein. Claims that do not recite "use quantified behavior as a way to control key elements of federated learning" should not have such a limitation read into them based on this statement in the provisional filing.

The present techniques will be better understood with reference to the following enumerated embodiments:

1. A tangible, non-transitory, machine-readable medium storing instructions that when executed by one or more processors effectuate operations comprising: receiving, with a computer system, a data token to be passed from a first node to a second node, wherein: the first node and second nodes are members of a set of nodes participating in a federated machine-learning model executed by the computer system, the federated machine-learning model comprises an application-layer network of sub-models of the federated machine-learning model, different members of the set of nodes control different subsets of the sub-models in the application-layer network, the data token corresponding to data upon which the federated machine-learning model operates, and the data token is not among data upon which a sub-model of the second node was trained; retrieving, with the computer system, machine learning model attributes from a collection of one or more of the sub-models of the federated machine-learning model; determining, with the computer system, based on the machine learning model attributes, that the data token is learning relevant to members of the collection of one or more of the sub-models with means for statistics testing and, in response, adding the data toke to a training set to be used by at least some members of the collection of one or more of the sub-models; determining, with the computer system, a collection of data tokens to transmit from the second node to a third node of the set of nodes participating in a federated machine-learning model; and transmitting, with the computer system, the collection of data tokens from the second node to the third node across an interface between the second node and the third node.
2. The medium of embodiment 2, wherein determining that the data token is learning relevant comprises determining a measure of a behavioral impact of the data token on an entity modeled by the federated machine-learning model.
3. The medium of embodiment 2, wherein the measure of the behavioral impact is indicative of a change in expected spending over time, location, or products.
4. The medium of embodiment 1, further comprising: obtaining, with the computer system, for a plurality of entities corresponding to the set of nodes, datasets, wherein: the datasets comprise events involving the plurality of entities; the datasets comprise or are otherwise associated with attributes of the plurality of entities; and the events are distinct from the attributes; forming, with the computer system, a plurality of objects, wherein each object of the plurality of objects comprises a different set of attributes and events; forming, with the computer system, a library of classes with a plurality of object-orientation modelors; and forming, with the computer system, a plurality of object-manipulation functions, each function being configured to leverage a respective class among the library of classes; receiving, with the computer system, a request from a first entity from the plurality of entities to determine a set of actions to achieve, or increase the likelihood of, a given targeted action; assigning, with the computer system, the given targeted action to a first subset of classes from the library of classes; and determining, with the computer system, based on the assigning, the set of actions to achieve, or increase likelihood of, the given targeted action using a first subset of the plurality of object-manipulation functions leveraging the first subset of classes from the library of classes.
5. The medium of embodiment 4, wherein determining the set of actions to achieve, or increase the likelihood of, the given targeted action further comprises: forming a first training dataset from the datasets; training, with one or more processors, a first machine-learning model on the first training dataset by adjusting parameters of the first machine-learning model to optimize a first objective function that indicates an accuracy of the first subset of the plurality of object-manipulation functions in leveraging the first subset of classes from the library of classes; and storing, with one or more processors, the adjusted parameters of the trained first machine-learning model in memory.
6. The medium of embodiment 5, wherein training comprises steps for training.
7. The medium of embodiment 5, wherein: at least some of the data in the first training dataset is obtained from the first entity.
8. The medium of embodiment 4, the operations further comprising: forming a second training dataset from the datasets; training, with one or more processors, a second machine-learning model on the second training dataset by adjusting parameters of the second machine-learning model to optimize a second objective function that indicates an accuracy of the plurality of object-orientation modelors in generating the library of classes; and storing the adjusted parameters of the trained second machine-learning model in memory.
9. The medium of embodiment 4, wherein: at least some of the obtained datasets are processed datasets, prepared by the corresponding entities from the plurality of entities, to not reveal more than a threshold amount of information.

10. The medium of embodiment 8, wherein: the processed datasets are prepared, by the corresponding entities from the plurality of entities, based on a set of rules, wherein the set of rules comprises cybersecurity and privacy policies.

11. The medium of embodiment 4, wherein the datasets comprise: consumers; communications to consumers by an enterprise; communications to an enterprise by consumers; purchases by consumers from an enterprise; non-purchase interactions by consumers with an enterprise; or a customer relationship management system of an enterprise; and wherein: the enterprise is a credit card issuer and the given targeted action is predicting whether a consumer will default; the enterprise is a lender and the given targeted action is predicting whether a consumer will borrow; the enterprise is an insurance company and the given targeted action is predicting whether a consumer will file a claim; the enterprise is an insurance company and the given targeted action is predicting whether a consumer will sign-up for insurance; the enterprise is a vehicle seller and the given targeted action is predicting whether a consumer will purchase a vehicle; the enterprise is a seller of goods and the given targeted action is predicting whether a consumer will file a warranty claim, the enterprise is a wireless operator and the given targeted action is predicting whether a consumer upgrade their cellphone, or the enterprise is a bank and the given targeted action is predicting GDP variation.

12. The medium of embodiment 4, wherein the plurality of object-manipulation functions comprises: a sequence function used to change a collection of events into a time sequences for processing; a feature function used to gather features of a first object-orientation modelor and then use the features in a second object-orientation modelor; and an ensembling function used to combine a first subset of the library of classes.

13. The medium of embodiment 4, wherein the plurality of object-orientation modelors comprises: a scaled propensity modelor used to calculate probability of a customer making an economic commitment; a timing modelor used to calibrate moments in time when a customer is likely to engage with the given targeted action; an affinity modelor used to capture ranked likes and dislikes of an entity's customers for a first subset of targeted actions; a best action modelor used to create a framework for concurrent Key Performance Index of the given targeted action at different points in a customer's journey; and a cluster modelor used to group an entity's customers based on the customers' behavior into a finite list.

14. The medium of embodiment 4, the operations further comprising: forming a third training dataset from the datasets; training a third machine-learning model on the third training dataset by adjusting parameters of the third machine-learning model to optimize a third objective function that indicates interdependency of the plurality of object-manipulation functions in leveraging a specific class; forming an interdependency graph using, at least in part, the third objective function, wherein the interdependency graph comprises a plurality of execution triggers, wherein each execution trigger from the plurality of execution triggers comprises a subset of the object-manipulation functions; and storing the adjusted parameters of the trained third machine-learning model in memory.

15. The medium of embodiment 14, the operations further comprising: forming an interdependency graph using, at least in part, ontology semantics by leveraging feature engineering modelors, wherein the feature engineering modelors comprise: recency feature engineering modelors; frequency feature engineering modelors; lag feature engineering modelors; difference feature engineering modelors; or harmonic analysis feature engineering modelors.

16. The medium of embodiment 15, wherein the ontology semantics comprise a concurrent ontology labeling datastore (COLD) methodology.

17. The medium of embodiment 14, wherein: the interdependency graph comprises a plurality of execution schedules, wherein each execution schedule from the plurality of execution schedules comprises a subset of the object-manipulation functions.

18. The medium of embodiment 4, wherein the attributes comprising: entity restrictions for at least some of the plurality of entities; entity business protocols for at least some of the plurality of entities; entity policies for at least some of the plurality of entities; entity authorized users for at least some of the plurality of entities; and entity security protocols for at least some of the plurality of entities.

19. The medium of embodiment 1, wherein: at least some of the datasets are updated in real-time.

20. The medium of embodiment 1, wherein: at least some of the datasets are updated using a record level stream.

21. A method, comprising the operations of any one of embodiments 1-20.

22. A system, comprising: one or more processors and memory storing instructions that when executed by the processors effectuate the operations of any one of embodiments –20.

What is claimed is:

1. A tangible, non-transitory, machine-readable medium storing instructions that when executed by one or more processors effectuate operations comprising:
   receiving, with a computer system, a data token to be passed from a first node to a second node, wherein:
      the first node and second nodes are members of a set of nodes participating in a federated machine-learning model executed by the computer system,
      the federated machine-learning model comprises an application-layer network of sub-models of the federated machine-learning model,
      different members of the set of nodes control different subsets of the sub-models in the application-layer network,
      the data token corresponding to data upon which the federated machine-learning model operates, and
      the data token is not among data upon which a sub-model of the second node was trained;
   retrieving, with the computer system, machine learning model attributes from a collection of one or more of the sub-models of the federated machine-learning model;
   determining, with the computer system, based on the machine learning model attributes, that the data token is learning relevant to members of the collection of one or more of the sub-models with means for statistics testing and, in response, adding the data token to a training set to be used by at least some members of the collection of one or more of the sub-models;

determining, with the computer system, a collection of data tokens to transmit from the second node to a third node of the set of nodes participating in a federated machine-learning model;

transmitting, with the computer system, the collection of data tokens from the second node to the third node across an interface between the second node and the third node;

obtaining, with the computer system, for a plurality of entities corresponding to the set of nodes, datasets, wherein:

the datasets comprise events involving the plurality of entities;

the datasets comprise or are otherwise associated with attributes of the plurality of entities; and the events are distinct from the attributes;

forming, with the computer system, a plurality of objects, wherein each object of the plurality of objects comprises a different set of attributes and events;

forming, with the computer system, a library of classes with a plurality of object-orientation modelors;

forming, with the computer system, a plurality of object-manipulation functions, each function being configured to leverage a respective class among the library of classes;

receiving, with the computer system, a request from a first entity from the plurality of entities to determine a set of actions to achieve, or increase the likelihood of, a given targeted action;

assigning, with the computer system, the given targeted action to a first subset of classes from the library of classes;

determining, with the computer system, based on the assigning, the set of actions to achieve, or increase likelihood of, the given targeted action using a first subset of the plurality of object-manipulation functions leveraging the first subset of classes from the library of classes;

forming a third training dataset from the datasets;

training a third machine-learning model on the third training dataset by adjusting parameters of the third machine-learning model to optimize a third objective function that indicates interdependency of the plurality of object-manipulation functions in leveraging a specific class;

forming an interdependency graph using, at least in part, the third objective function, wherein the interdependency graph comprises a plurality of execution triggers, wherein each execution trigger from the plurality of execution triggers comprises a subset of the object-manipulation functions; and storing the adjusted parameters of the trained third machine-learning model in memory.

2. The medium of claim 1, wherein determining that the data token is learning relevant comprises determining a measure of a behavioral impact of the data token on an entity modeled by the federated machine-learning model.

3. The medium of claim 2, wherein the measure of the behavioral impact is indicative of a change in expected spending over time, location, or products.

4. The medium of claim 1, wherein determining the set of actions to achieve, or increase the likelihood of, the given targeted action further comprises:

forming a first training dataset from the datasets;

training, with one or more processors, a first machine-learning model on the first training dataset by adjusting parameters of the first machine-learning model to optimize a first objective function that indicates an accuracy of the first subset of the plurality of object-manipulation functions in leveraging the first subset of classes from the library of classes; and storing, with one or more processors, the adjusted parameters of the trained first machine-learning model in memory.

5. The medium of claim 4, wherein training comprises steps for training.

6. The medium of claim 4, wherein:

at least some of the data in the first training dataset is obtained from the first entity.

7. The medium of claim 1, the operations further comprising:

forming a second training dataset from the datasets;

training, with one or more processors, a second machine-learning model on the second training dataset by adjusting parameters of the second machine-learning model to optimize a second objective function that indicates an accuracy of the plurality of object-orientation modelors in generating the library of classes; and storing the adjusted parameters of the trained second machine-learning model in memory.

8. The medium of claim 1, wherein:

at least some of the obtained datasets are processed datasets, prepared by the corresponding entities from the plurality of entities, to not reveal more than a threshold amount of information.

9. The medium of claim 8, wherein:

the processed datasets are prepared, by the corresponding entities from the plurality of entities, based on a set of rules, wherein the set of rules comprises cybersecurity and privacy policies.

10. The medium of claim 1, wherein the datasets comprise:

consumers;

communications to consumers by an enterprise;

communications to an enterprise by consumers;

purchases by consumers from an enterprise;

non-purchase interactions by consumers with an enterprise; or a customer relationship management system of an enterprise; and wherein:

the enterprise is a credit card issuer and the given targeted action is predicting whether a consumer will default;

the enterprise is a lender and the given targeted action is predicting whether a consumer will borrow;

the enterprise is an insurance company and the given targeted action is predicting whether a consumer will file a claim;

the enterprise is an insurance company and the given targeted action is predicting whether a consumer will sign-up for insurance;

the enterprise is a vehicle seller and the given targeted action is predicting whether a consumer will purchase a vehicle;

the enterprise is a seller of goods and the given targeted action is predicting whether a consumer will file a warranty claim;

the enterprise is a wireless operator and the given targeted action is predicting whether a consumer upgrade their cellphone; or the enterprise is a bank and the given targeted action is predicting GDP variation.

11. The medium of claim 1, wherein the plurality of object-manipulation functions comprises:
   a sequence function used to change a collection of events into a time sequence for processing;
   a feature function used to gather features of a first object-orientation modelor and then use the features in a second object-orientation modelor; and
   an ensembling function used to combine a first subset of the library of classes.

12. The medium of claim 1, wherein the plurality of object-orientation modelors comprises:
   a scaled propensity modelor used to calculate probability of a customer making an economic commitment;
   a timing modelor used to calibrate moments in time when a customer is likely to engage with the given targeted action;
   an affinity modelor used to capture ranked likes and dislikes of an entity's customers for a first subset of targeted actions;
   a best action modelor used to create a framework for concurrent Key Performance Index of the given targeted action at different points in a customer's journey; and
   a cluster modelor used to group an entity's customers based on the customers' behavior into a finite list.

13. The medium of claim 1, the operations further comprising:
   forming an interdependency graph using, at least in part, ontology semantics by leveraging feature engineering modelors, wherein the feature engineering modelors comprise:
   recency feature engineering modelors;
   frequency feature engineering modelors;
   lag feature engineering modelors;
   difference feature engineering modelors; or
   harmonic analysis feature engineering modelors.

14. The medium of claim 13, wherein the ontology semantics comprise a concurrent ontology labeling datastore (COLD) methodology.

15. The medium of claim 1, wherein:
   the interdependency graph comprises a plurality of execution schedules, wherein each execution schedule from the plurality of execution schedules comprises a subset of the object-manipulation functions.

16. The medium of claim 1, wherein the attributes comprising:
   entity restrictions for at least some of the plurality of entities;
   entity business protocols for at least some of the plurality of entities;
   entity policies for at least some of the plurality of entities;
   entity authorized users for at least some of the plurality of entities; and
   entity security protocols for at least some of the plurality of entities.

17. The medium of claim 1, wherein:
   at least some of the datasets are updated in real-time.

18. The medium of claim 1, wherein:
   at least some of the datasets are updated using a record level stream.

19. A method, comprising:
   receiving, with a computer system, a data token to be passed from a first node to a second node, wherein:
   the first node and second nodes are members of a set of nodes participating in a federated machine-learning model executed by the computer system,
   the federated machine-learning model comprises an application-layer network of sub-models of the federated machine-learning model,
   different members of the set of nodes control different subsets of the sub-models in the application-layer network,
   the data token corresponding to data upon which the federated machine-learning model operates, and
   the data token is not among data upon which a sub-model of the second node was trained;
   retrieving, with the computer system, machine learning model attributes from a collection of one or more of the sub-models of the federated machine-learning model;
   determining, with the computer system, based on the machine learning model attributes, that the data token is learning relevant to members of the collection of one or more of the sub-models with means for statistics testing and, in response, adding the data token to a training set to be used by at least some members of the collection of one or more of the sub-models;
   determining, with the computer system, a collection of data tokens to transmit from the second node to a third node of the set of nodes participating in a federated machine-learning model;
   transmitting, with the computer system, the collection of data tokens from the second node to the third node across an interface between the second node and the third node;
   obtaining, with the computer system, for a plurality of entities corresponding to the set of nodes, datasets, wherein:
   the datasets comprise events involving the plurality of entities;
   the datasets comprise or are otherwise associated with attributes of the plurality of entities; and
   the events are distinct from the attributes;
   forming, with the computer system, a plurality of objects, wherein each object of the plurality of objects comprises a different set of attributes and events;
   forming, with the computer system, a library of classes with a plurality of object-orientation modelors;
   forming, with the computer system, a plurality of object-manipulation functions, each function being configured to leverage a respective class among the library of classes;
   receiving, with the computer system, a request from a first entity from the plurality of entities to determine a set of actions to achieve, or increase the likelihood of, a given targeted action;
   assigning, with the computer system, the given targeted action to a first subset of classes from the library of classes;
   determining, with the computer system, based on the assigning, the set of actions to achieve, or increase likelihood of, the given targeted action using a first subset of the plurality of object-manipulation functions leveraging the first subset of classes from the library of classes;
   forming a third training dataset from the datasets;
   training a third machine-learning model on the third training dataset by adjusting parameters of the third machine-learning model to optimize a third objective function that indicates interdependency of the plurality of object-manipulation functions in leveraging a specific class;
   forming an interdependency graph using, at least in part, the third objective function, wherein the interdependency graph comprises a plurality of execution triggers, wherein each execution trigger from the plurality of execution triggers comprises a subset of the object-manipulation functions; and storing the adjusted parameters of the trained third machine-learning model in memory.

* * * * *